Aug. 2, 1938.  E. ROTZOLL  2,125,584
ADJUSTING DEVICE FOR MACHINE TOOLS
Filed Nov. 15, 1937  2 Sheets-Sheet 1
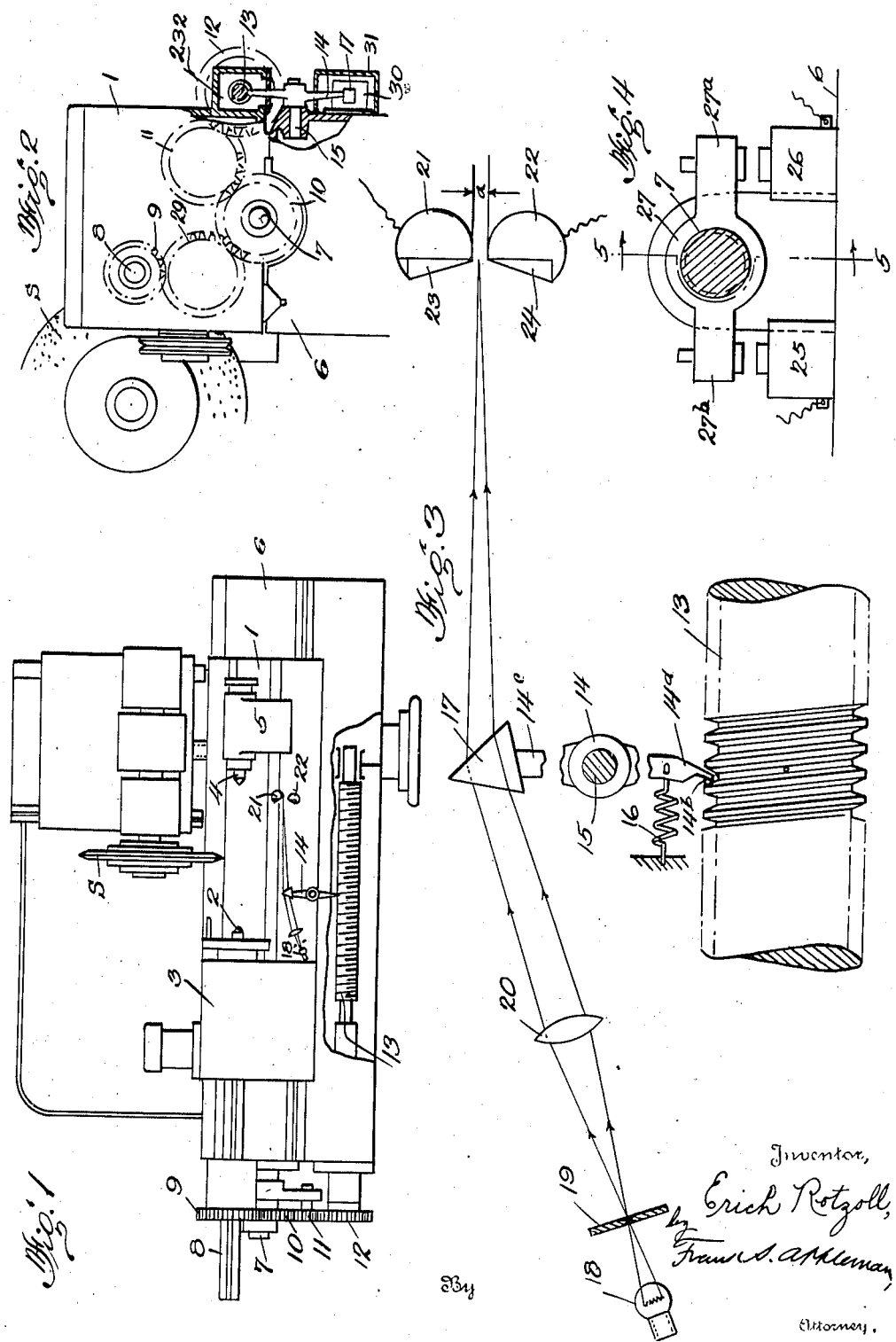
Inventor,
Erich Rotzoll,
by Frans A. Appleman
Attorney.

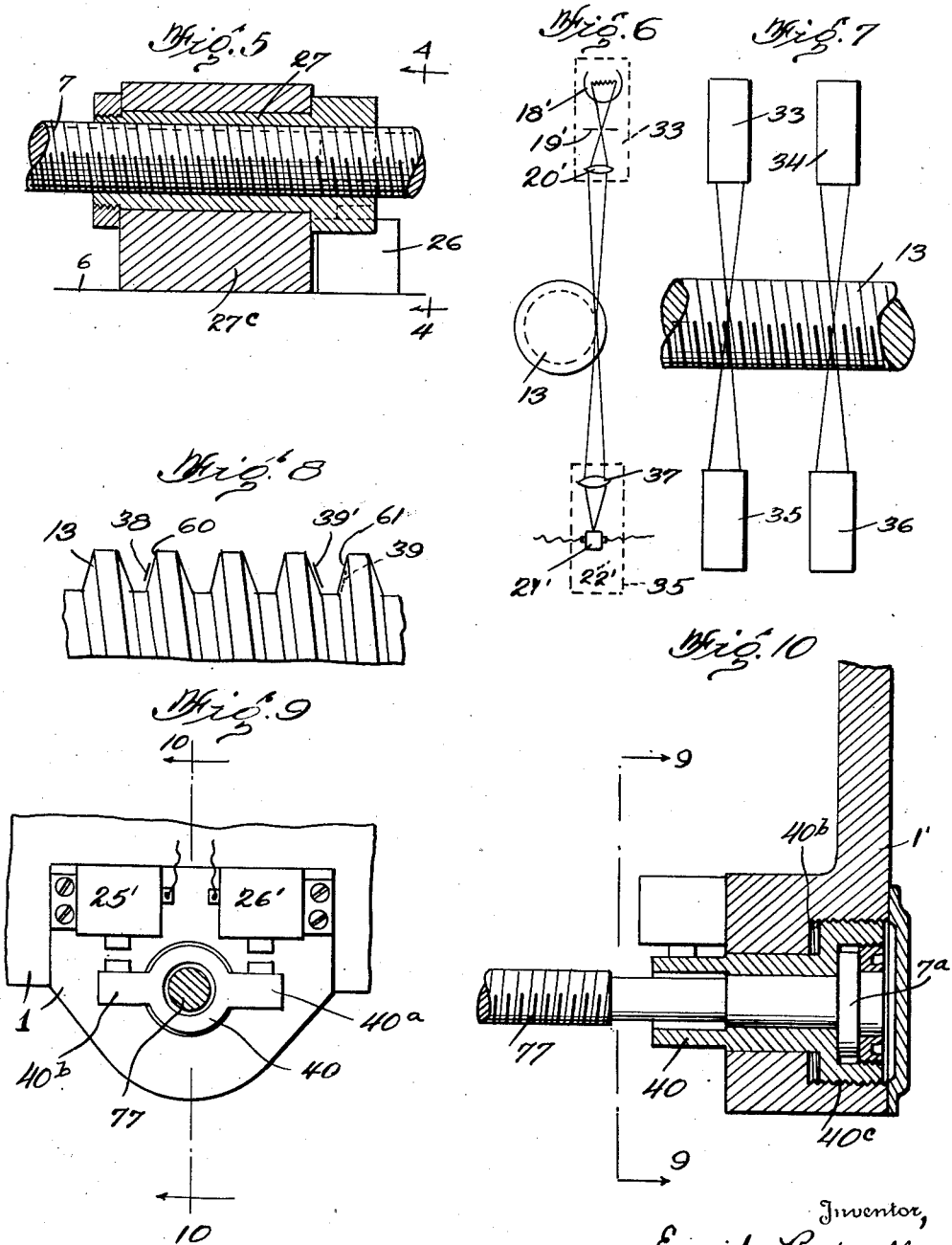

Patented Aug. 2, 1938

2,125,584

UNITED STATES PATENT OFFICE 2,125,584

ADJUSTING DEVICE FOR MACHINE TOOLS

Erich Rotzoll, Berlin-Frohnau, Germany

Application November 15, 1937, Serial No. 174,681
In Germany November 16, 1936

8 Claims. (Cl. 51—95)

This invention relates to a device for the automatic adjustment of errors in the pitch of screw spindle gears for the production of accurate longitudinal movements of machine guide blocks or sliding carriages, particularly in machine tools for the production of threads, as in screw threading lathes, thread grinding machines and the like.

It is customary to overcome the error of pitch of the screw spindle of such machine tools by means of a curved bar which is shaped to correspond to the errors of the spindle and which is called a correction guide. This correction guide is mounted upon the base of the machine parallel to channel guides or upon the moving guide block. A lever is mounted against the course of the curve of the correction guide which operates to twist the thread bolt of the moving screw spindle. In this manner, greater or lesser supplementary movement is transmitted to the screw spindle and through it to the guide block or sliding carriage, which supplementary movement overcomes the error of pitch and assures an accurate even feeding motion of the guide block.

In coordinating drilling and measuring machines which are provided with a manually operated measuring screw spindle with pitch drum and slide rule for the accurate shifting of the measuring guide block or sliding carriage, the nonius or the pitch drum is adjustingly twisted from the correction guide by means of a lever arrangement in order to correct its helicoidal error.

This well known coordinating arrangement functions with sufficient accuracy, however, only for a short period, after which deviations appear in the accurate feeding motion of the guide block or sliding carriage which are caused by the wear and tear of the guide screw spindle and of the guide block tracks, so that it becomes necessary to readjust the corrector guide. This is a painstaking and expensive procedure.

An object of the invention is to eliminate these disadvantages by providing an adjusting device which is, to a great extent, not affected by the wear and tear of the machine parts and which, over a period of time, is more accurate.

A further object consists in the mounting of a non-propelling prime or master thread spindle parallel to the screw spindle, which latter drives and feeds the guide block, said master spindle being driven in such manner that its threads or twistings appear to be stationary, as compared with the guide block movement, and which master spindle guides by means of its thread or twisting, at least one light ray which lies in moving relation to it, in such manner that one or the other of two photo cells is affected to activate an electro-magnetic device, which latter transmits an error correcting supplementary movement to the driving spindle in a known manner.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a plan view of a thread grinding machine with a built-in adjusting device;

Figure 2 is a side view with parts broken away and parts in section of a portion of a thread grinding machine with the same adjusting device as in Fig. 1, but with a different arrangement of the latter;

Figure 3 is an enlarged fragmentary plan view of a part of Fig. 1;

Figure 4 is a vertical section taken substantially on the line 4—4 of Fig. 5, and shows one form of the electromagnetic transmission device inside of the adjustment device;

Figure 5 is a longitudinal vertical section on the line 5—5 of Fig. 4;

Figure 6 is a diagrammatic end elevation of a modified form of the device;

Figure 7 is a side elevation of the modification of Fig. 6;

Figure 8 is an enlarged and fragmentary elevation of the master thread spindle and shows the position of the light rays with relation to the master thread spindle shown in Figs. 6 and 7;

Figure 9 is a vertical fragmentary transverse section of a modification taken on the line 9—9 of Fig. 10; and Figure 10 is a longitudinal vertical section taken on the line 10—10 of Fig. 9.

The tooling machine to which the device of the invention is attached may be, for instance, a thread grinding machine 6. In a preferred form which is disclosed by Fig. 1, the workpiece, which is not shown, is held on a movable guide block 1 between the point 2 of the workpiece spindle stock 3 and the point 4 of the moving stock 5. The workpiece is rotated by a carrier which is mounted on the workpiece spindle 8, which carrier is guided along the rotating grinding disk S by means of the longitudinal shifting of the guiding block 1 in the channels of the base of the machine 6. Such longitudinal shifting of the guide block 1 is carried out by means of and regulated by the pitch of the thread formed on the workpiece. The longitudinal movement of the guide block 1 is caused by a driving thread spindle or lead screw 7 that is actuated by the workpiece spindle 8 by means of operatively connected gears 9, 29 and 10. From the gear wheel 10 mounted on the guide spindle 7 a gear wheel 12 is actuated by means of a connecting gear wheel 11, the said gear 12 being rigidly carried by a master thread spindle 13 rotatably mounted in the body of the machine 6. The thread of the spindle 13 is tempered, ground and lobated, and the pitch thereof is formed with an exceedingly high degree of accuracy. The spindle 13 is designated as a prime or master thread spindle. The master thread spindle in no way contributes to the propulsion of the guide block 1 and is virtually free from all mechanical stresses. It is mounted parallel to the lead or driving thread spindle 7 and has a thread length conforming to that of the working range of the guide block 1. The gear 29 which drives the drive spindle 7 through gear 10 is the same size as the gear 11 which drives the master thread spindle 13 through the gear 12. The gears 12 and 10 are also of the same size. The spindles 7 and 13 are of the same size and the threads thereof are of the same size and pitch. Consequently, the spindles 7 and 13 rotate in unison at the same speed.

On the guide block 1, a two-armed lever 14 is mounted for rocking movement on a journal 15. One arm 14a of the lever 14 has at its end a round knob 14b, which latter bears against one side of the thread of the master thread spindle 13 under the influence of a spring 16 which has one end connected to the arm 14a and the other end connected to the machine frame. On the lever arm 14c there is mounted a prism or a semi-transparent mirror 17. A light ray, shown by means of arrows, is guided from a light source 18 through a diaphragm 19 and a lens system 20, through the prism 17 mounted on lever 14, in such a manner that it normally passes through the space a between two light sensitive cells 21 and 22. However, swinging movement of the lever 14 permits the light ray to be alternately brought to bear upon either of the two photocells 21 and 22 (see Fig. 3). In front of photocells 21 and 22, respectively, are mounted prisms or the like 23 and 24. As the spindles 7 and 13 are rotating in unison at the same speed, the end 14a normally rides along the thread groove of the spindle 13 without causing any swinging movement of the lever 14. However, when the movement of the guide block 1 deviates from the movement of the master thread spindle 13, because of a feeding oscillation created in the dividing guide thread spindle 7 through an error of the pitch thereof, then the lever 14, since it is mounted on guide block 1, turns slightly on its pivot. Consequently, prism 17 mounted on lever 14 makes an oscillating movement, and the light ray is then directed on one of the photocells 21 and 22 through either the prisms 23 or 24. The lighting of the photocells releases an electric current in any desired known manner which, in turn, activates magnet 25 (Fig. 4) which, for instance, is operated by the photocell 21, or the magnet 26 that is operated by the photocell 22. These magnets attract either of the arms 27b and 27a of the axially rigid, but rotatably mounted and internally threaded collar 27 that threadedly engages the guide thread spindle 7 at any appropriate place thereon. These arms 27b and 27a lie opposite the magnets 25 and 26. According to whether one or the other photocell is lighted, the guide spindle collar 27 is consequently rotated in one or the other direction by means of the magnets 25, 26. In this manner, the rotation of spindle 7 is retarded or accelerated slightly and feeding of the guide block 1 is corrected in the appropriate direction until the corrected movement of the guide block 1 swings the arm 14 back and directs the light ray away from the respective photocell and into the space a which lies between the two photocells. As soon as the light ray goes through the space a, it indicates that the guiding feed is in coordination with the movement of the master thread spindle 13.

The sensitiveness of the device can be increased by making the distance between prism 17 and the photocells 21, 22 greater than the length of the lever arm 14c.

Instead of magnets, 25, 26, solenoids can be provided to accomplish the same result. The greater or lesser supplementary movement necessary for the adjustment of the error can also be transferred to the guide block 1 and the spindle 7 by means of the bushing 40 (Figs. 9 and 10) which carries the longitudinal stock of the driving spindle 77, said bushing being provided with outer threads 40c which grip a mother thread 40d of the boss in guide block 1', by which the longitudinal bushing has lateral arms 40a and 40b similar to those of the collar 27 which cooperates with the magnets 25', 26'. Through the turning movements of the longitudinal bushing 40, the guide block executes corrective auxiliary movements.

The master thread spindle 13 can also, as is shown in Fig. 2, be mounted in the workpiece guide block 1. It is actuated, as aforesaid, by workpiece spindle 8 through interengaging gears 9, 29 which connect with the spindle gear 10 and toothed wheels 11 and 12. The lever 14 which carries the prism 17 and the arm 14a of which is engaged in the master thread of spindle 13 is in this form mounted on the frame of the machine 6. The device is covered by a protecting cap 31. The master thread spindle 13 is also protected against dirt and damage, since it lies in a canal 32 of the guide block 1 parallel to the guiding spindle 7.

The master thread spindle 13 could also be mounted co-axially with the workpiece spindle 8.

In the form of Figs. 6–8, the light rays are guided directly through the grooves of the master thread spindle 13 in the following way. The light source 18' and diaphragm 19' with the lens system 20' are enclosed in a housing 33. A second light, diaphragm and lens are similarly enclosed in an adjacent housing 34, and opposite to the housings 33 and 34 in housings 35 and 36, respectively, are mounted the photocells 21' and 22' belonging to said first housings. The light rays from the light sources 18' pass through the thread grooves of the spindle 13 and are focused in the axial section plane of such spindle. The guiding cell groups 33, 35 and 34, 36 are, as shown in Fig. 7, arranged side by side on opposite sides of the spindle 13, through the thread grooves of which, as seen in Fig. 8, the light ray or light band 38 of the guiding cell group 33, 35 passes just inwardly of the boundary line formed by a right hand side wall 60 of the master thread groove, while the light ray or light band 39 of the guiding cell group 34, 36 is intercepted by encountering a thread groove wall 61 several threads distant just inside said wall. A feeding oscillation of guide block 1 in one direction causes the light ray 38 to be cut off through its encounter with wall 60 of the master thread channel so that the related magnet 25 (not shown) receives a guiding impulse in the same manner as in Fig. 4. An oscillating movement of guide block 1 in the other direction activates the magnet 26 (not shown) through guiding cell group 34, 36 because such movement moves the light ray 39 out of contact with thread wall 61 and permits the passage thereof to the cell 22'. Should the light rays be in the position indicated in Fig. 8, no activation of the magnets 25, 26 takes place. In other words, there is perfect coordination between the guide block movement and the movement of the master thread. When the master thread spindle 13 is located in the body 6 of the machine as in Fig. 1, then the guide cell groups are located on the guide block 1. Should, however, the master thread spindle 13 be located in the movable guide block 1 as in Fig. 2, then the guiding cells are situated in the body of the machine. The light ray 39 can be so arranged that it is sensitized by the other side of the master thread. This arrangement is indicated by reference character 39' in Fig. 8. The photocell belonging to light ray 39' is then actuated into a guiding current process by means of the light ray being shut off. The correction of the error is accomplished in the same manner as in Figs. 1–5 by means of 25, 26, 27, 27a and 27b.

The device of the invention has the advantage that the part which is responsible for the accurate elimination of the error, the master thread spindle, remains independent of the deviations and changes showing in the course of time in the working parts and tracks of the guiding block, and is not thereby subject to wear and tear to any appreciable extent. On the contrary, the master thread spindle permanently retains its original accuracy, which enables it to accurately correct errors for a long time. In thread making machines, it is possible also to make adjustments in the entire pitch thread spindles which are plus or minus adjusted with the assistance of this device. For this purpose, the master thread spindle need only be driven by conforming reciprocal gear or other driving wheels.

The invention can also be used with success in jig boring machine tables actuated by means of screw spindles, as well as in measuring machines.

I claim:

1. A device of the class described, including a guide block, a threaded drive spindle threadedly engaging said block to drive the same longitudinally thereof, a non-driving master spindle mounted in parallel relation to said drive spindle, means rotating both of said spindles at identical speeds, means for correcting deviations of movement of said guide block caused by errors in the pitch of the threads of said drive spindle as compared with the threads of said master spindle, electromagnetic means actuating said correcting means, at least one source of light arranged in moving relation to said master spindle, a light ray produced by said source of light, said ray being movable upon deviations in movement of said guide block, and light sensitive means operable by said ray upon said deviations to actuate said electromagnetic means to correct said deviations of movement of said block.

2. A device of the class described, including a guide block, a threaded drive spindle threadedly engaging said block to drive the same longitudinally thereof, a non-driving master spindle mounted in parallel relation to said drive spindle, means rotating both of said spindles at identical speeds, means for correcting deviations of movement of said guide block caused by errors in the pitch of the threads of said drive spindle as compared with the threads of said master spindle, electromagnetic means actuating said correcting means, a pivotally mounted two-armed lever mounted adjacent said master spindle, one arm of said lever fitting in the thread groove of said master spindle, said lever and master spindle being relatively movable longitudinally of the latter, light ray bending means carried by the other arm of said lever, at least one source of light arranged in moving relation to said master spindle, a light ray produced by said source of light and being directed through said ray bending means, a pair of spaced light sensitive cells for actuating said electromagnetic means, said light ray normally passing between said cells, said lever being movable upon its pivot upon said deviations of movement of said block to direct said ray upon one of said cells to activate the same.

3. A device of the class described, including a guide block, a threaded drive spindle threadedly engaging said block to drive the same longitudinally thereof, a non-driving master spindle mounted in parallel relation to said drive spindle, means rotating both of said spindles at identical speeds, means for correcting deviations of movement of said guide block caused by errors in the pitch of the threads of said drive spindle as compared with the threads of said master spindle, electromagnetic means actuating said correcting means, a pivotally mounted two-armed lever mounted adjacent said master spindle, one arm of said lever fitting in the thread groove of said master spindle, said lever and master spindle being relatively movable longitudinally of the latter, light ray bending means carried by the other arm of said lever, at least one source of light arranged in moving relation to said master spindle, a light ray produced by said source of light and being directed through said ray bending means, a pair of spaced light sensitive cells for actuating said electromagnetic means, said light ray normally passing between said cells, said lever being movable upon its pivot upon said deviations of movement of said block to direct said ray upon one of said cells to activate the same, and the distance between said ray bending means and said light sensitive cells being greater than the length of said lever arm carrying said ray bending means.

4. A device of the class described, including a guide block, a threaded drive spindle threadedly engaging said block to drive the same longitudinally thereof, a non-driving master spindle mounted in parallel relation to said drive spindle, means rotating both of said spindles at identical speeds, means for correcting deviations of movement of said guide block caused by errors in the pitch of the threads of said drive spindle as compared with the threads of said master spindle, electromagnetic means actuating said correcting means, two sources of light arranged adjacent said master spindle and relatively movable with respect thereto, light rays produced by said sources and extending transversely of said master spindle in the region of the thread grooves thereof, photocells on sides of said master spindle opposite to said light sources and alined with the rays thereof, one of said light rays normally passing through a thread groove adjacent one wall thereof to contact a photocell, said other ray normally being intercepted by a thread of said master spindle closely adjacent the wall thereof corresponding to said first named wall, said first photocell being actuated by the shutting off of said first light ray, said second photocell being actuated by the encounter of said second ray therewith, said photocells comprising means for actuating said deviation correcting electromagnetic means, and said rays being movable relative to said master spindle upon deviations of said guide block in either direction to actuate one of said photocells.

5. A device of the class described, including a sliding carriage, a drive screw spindle for actuating said carriage, a master spindle arranged in parallel relation to said drive spindle, means for rotating both of said spindles at the same speed, means for compensating for deviations in movement of said carriage caused by imperfection in the threads of said drive spindle, and means operatively associated with said master spindle for automatically actuating said compensating means upon the occurrence of a deviation in movement of said carriage.

6. A device of the class described, including a sliding carriage, a drive screw spindle for actuating said carriage, a master spindle arranged in parallel relation to said drive spindle, means for rotating both of said spindles at the same speed, means for compensating for deviations in movement of said carriage caused by imperfection in the threads of said drive spindle, and light sensitive means operatively associated with said master spindle for automatically actuating said compensating means upon the occurrence of a deviation in movement of said carriage.

7. A device of the class described, including a sliding carriage, a drive screw spindle for actuating said carriage, a master spindle arranged in parallel relation to said drive spindle, means for rotating both of said spindles at the same speed, means for compensating for deviations in movement of said carriage caused by imperfection in the threads of said drive spindle, a pair of light sensitive cells for actuating said compensating means, at least one source of light, and means operatively associated with said master spindle for directing a beam of light from said source to one of said cells to energize the same to actuate said compensating means upon the occurrence of a deviation of movement in said carriage.

8. A device of the class described, including a sliding carriage, a drive screw spindle for actuating said carriage, means for compensating for deviation in movement of said carriage caused by imperfections in the threads of said guide spindle, light sensitive means for actuating said compensating means, a source of light, and means for moving a beam of said light relative to said light sensitive means to actuate the latter upon the occurrence of a deviation of movement of said carriage.

ERICH ROTZOLL.